US011893839B2

(12) United States Patent
Blais et al.

(10) Patent No.: US 11,893,839 B2
(45) Date of Patent: Feb. 6, 2024

(54) PERFORMANCE SYSTEM FOR ANALYZING A VEHICLE'S PERFORMANCE

(71) Applicant: Integrated Engineering LLC, Salt Lake City, UT (US)

(72) Inventors: Peter Blais, Park City, UT (US); David Blais, Salt Lake City, UT (US)

(73) Assignee: Integrated Engineering LLC, Salt Lake City, UT (US)

( * ) Notice: Subject to any disclaimer, the term of this patent is extended or adjusted under 35 U.S.C. 154(b) by 378 days.

(21) Appl. No.: 17/327,464

(22) Filed: May 21, 2021

(65) Prior Publication Data

US 2022/0375280 A1 Nov. 24, 2022

(51) Int. Cl.
*G07C 5/08* (2006.01)

(52) U.S. Cl.
CPC ......... *G07C 5/0816* (2013.01); *G07C 5/0808* (2013.01); *G07C 2205/02* (2013.01)

(58) Field of Classification Search
CPC ........................... G07C 5/0816; G07C 5/0808; G07C 2205/02; G07C 5/0841; G07C 5/008
See application file for complete search history.

(56) References Cited

U.S. PATENT DOCUMENTS

| | | | | |
|---|---|---|---|---|
| 2016/0031449 | A1 * | 2/2016 | Carnell | G07C 5/008 701/33.2 |
| 2019/0226409 | A1 * | 7/2019 | Hoffman | F02D 41/023 |

* cited by examiner

*Primary Examiner* — Michael V Kerrigan
(74) *Attorney, Agent, or Firm* — Kirton McConkie; Brian Tucker

(57) ABSTRACT

A performance system can enable an untrained end user to analyze the performance of a vehicle based on performance data that the vehicle's ECU generates. The performance system can include a performance tool that is configured to request performance data from one or more ECUs of a vehicle. The performance system can also include a performance engine that interfaces with the performance tool to create a log of the performance data. The performance engine can be configured to process the performance data log to generate a number of performance values which correspond to performance parameters. The performance engine can then use the performance values to generate performance representations which can then be presented to the end user.

19 Claims, 9 Drawing Sheets

Performance Data Log 300

| Time | Engine Speed | Intake Air Temperature | Ignition Correction Cylinder 1 | Ignition Correction Cylinder 2 | Ignition Correction Cylinder 3 | ... | HPFP | Boost Pressure | ... |
|---|---|---|---|---|---|---|---|---|---|
| 00:30.273 | 3458 | 39 | 0 | 0 | -1.75 | ... | 138829.144 | 1920.867 | ... |
| 00:30.275 | 3458 | 39 | 0 | 0 | -1.75 | ... | 138829.144 | 1920.867 | ... |
| 00:30.276 | 3458 | 39 | 0 | 0 | -1.75 | ... | 138829.144 | 1920.867 | ... |
| 00:30.289 | 3458 | 39 | 0 | 0 | -1.75 | ... | 138829.144 | 1920.867 | ... |
| ⋮ | | | | | | | | | |
| 00:31.810 | 4073 | 41.25 | 0 | 0 | -2.5 | ... | 138091.509 | 1965.975 | ... |
| ⋮ | | | | | | | | | |
| 00:37.577 | 6371 | 59.25 | 0 | 0 | -1.75 | ... | 145016.781 | 2006.604 | ... |
| ⋮ | | | | | | | | | |

FIG. 3

Performance Data Log 300a

| Time | Rounded Engine Speed | Intake Air Temperature | Ignition Correction Cylinder 1 | Ignition Correction Cylinder 2 | Ignition Correction Cylinder 3 | ... | HPFP | Boost Pressure | ... |
|---|---|---|---|---|---|---|---|---|---|
| 00:30.273 | ~~3458~~ 3500 | 39 | 0 | 0 | -1.75 | ... | 138829.144 | 1920.867 | ... |
| 00:30.275 | ~~3458~~ 3500 | 39 | 0 | 0 | -1.75 | ... | 138829.144 | 1920.867 | ... |
| 00:30.276 | ~~3458~~ 3500 | 39 | 0 | 0 | -1.75 | ... | 138829.144 | 1920.867 | ... |
| 00:30.289 | ~~3458~~ 3500 | 39 | 0 | 0 | -1.75 | ... | 138829.144 | 1920.867 | ... |
| ⋮ | | | | | | | | | |
| 00:31.810 | ~~4073~~ 4000 | 41.25 | 0 | 0 | -2.5 | ... | 138091.509 | 1965.975 | ... |
| ⋮ | | | | | | | | | |
| 00:37.577 | ~~6371~~ 6500 | 59.25 | 0 | 0 | -1.75 | ... | 145016.781 | 2006.604 | ... |
| ⋮ | | | | | | | | | |

*FIG. 3A*

PERFORMANCE SYSTEM FOR ANALYZING A VEHICLE'S PERFORMANCE

CROSS-REFERENCE TO RELATED APPLICATIONS

N/A

BACKGROUND

For purposes of this disclosure and the claims, an "electronic control unit" or "ECU" is an embedded computing device that controls a vehicle's electrical system. A vehicle may typically have multiple ECUs such as an engine control module (ECM), a powertrain control module (PCM), a transmission control module (TCM), etc.

Various standards have been developed for communicating with an ECU. For example, the controller area network (CAN) standard defines a serial communications bus and corresponding protocol for connecting and communicating with an ECU. As another example, the OBD-2 standard defines the hardware interface (or connector/port) for connecting external computing devices to a vehicle's CAN bus and various messaging formats for communicating with an ECU over the CAN bus. A key purpose of the OBD-2 standard is to define diagnostic functionality that all vehicles must support. For example, the SAE J1979 standard defines a number of parameter IDs (or PIDs) that are used to request diagnostic data from an ECU.

BRIEF SUMMARY

The present invention extends to systems, methods and computer program products for analyzing a vehicle's performance. A performance system can enable an untrained end user to analyze the performance of a vehicle based on performance data that the vehicle's ECU generates. The performance system can include a performance tool that is configured to request performance data from one or more ECUs of a vehicle. The performance system can also include a performance engine that interfaces with the performance tool to create a log of the performance data. The performance engine can be configured to process the performance data log to generate a number of performance values which correspond to performance parameters. The performance engine can then use the performance values to generate performance representations which can then be presented to the end user.

In some embodiments, the present invention may be implemented as a performance system that includes a performance tool and a performance engine. The performance tool can be configured to connect to an ECU of a vehicle and to read performance data from the ECU over a period of time. Each reading of the performance data may include values for a plurality of performance parameters. The performance engine may interface with the performance tool to receive and store the performance data in a performance data log. The performance engine may be configured to perform a method for enabling an end user to analyze performance of the vehicle using the performance data log in which the performance engine: processes the performance data log to generate a set of performance values for a first performance parameter of the plurality of performance parameters; generates a performance representation from the set of performance values for the first performance parameter; and presents the performance representation to the end user.

In some embodiments, the present invention may be implemented by a performance engine as a method for enabling an end user to analyze performance of a vehicle using a performance data log. The performance engine may obtain a performance data log containing performance data read from an ECU of the vehicle over a period of time. Each reading of the performance data may include values for a plurality of performance parameters. The performance engine may process the performance data log to generate a set of performance values for a first performance parameter that correspond to different values for an engine speed performance parameter. The performance engine may generate a performance representation from the set of performance values for the first performance parameter. The performance engine may then present the performance representation to the end user.

In some embodiments, the present invention may be implemented as computer storage media storing computer executable instructions which when executed implement a method for enabling an end user to analyze performance of a vehicle using a performance data log. A performance data log may be obtained. The performance data log may contain performance data read from an ECU of the vehicle over a period of time and each reading of the performance data may include values for a plurality of performance parameters. The performance data log can then be processed to generate a first set of performance values for a first performance parameter that correspond to different values for an engine speed performance parameter and to generate a second set of performance values for a second performance parameter that correspond to the different values for the engine speed performance parameter. A first performance representation can then be generated from the first set of performance values for the first performance parameter. A second performance representation can also be generated from the second set of performance values for the second performance parameter. The first and second performance representations can then be presented to the end user.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIG. 3 provides an example of a portion of a performance data log in accordance with one or more embodiments of the present invention;

FIG. 3A provides an example of a portion of a filtered performance data log in accordance with one or more embodiments of the present invention;

DETAILED DESCRIPTION

In the specification and the claims, the term "performance" should be construed as encompassing diagnostics. For example, a performance system can be used to analyze a vehicle's performance which may include performing diagnostics. The term "performance parameter" should be construed as encompassing any parameter, including diagnostic parameters, that can be obtained from a vehicle's ECU. The term "engine speed," which is a gas vehicle term, should be construed as encompassing the equivalent performance parameter for electric vehicles (e.g., time steps).

Figure 1:
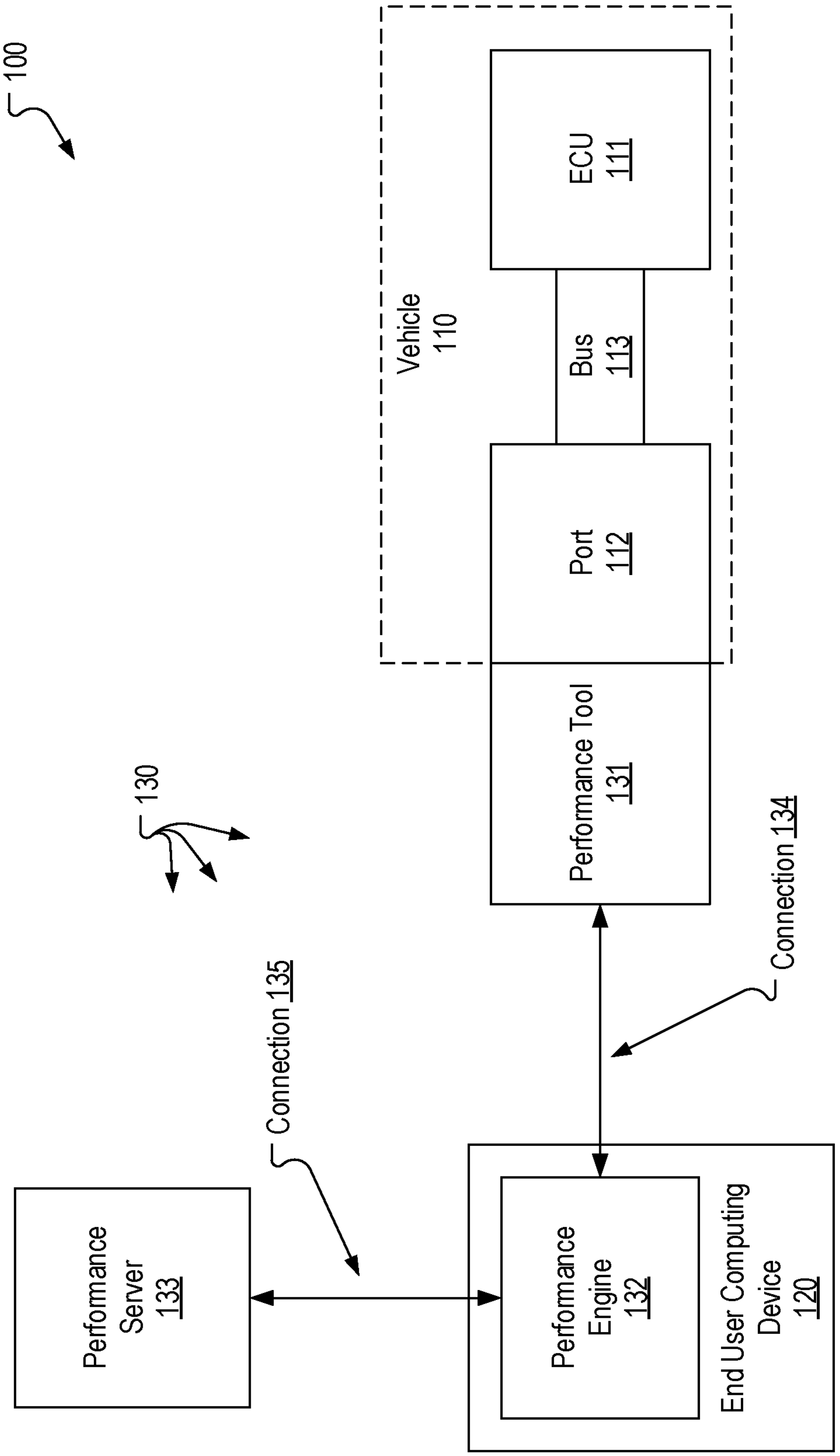
FIG. 1 provides an example of a computing environment in which one or more embodiments of the present invention may be used or implemented.

FIG. 1 provides an example of a computing environment 100 in which embodiments of the present invention may be included, used or implemented. Computing environment 100 includes at least one ECU 111 of a vehicle 110. ECU 111 may typically represent an ECM, but could represent any other type of ECU that may generate performance data for the vehicle. Vehicle 110 may include a port 112, which may typically be an OBD-2 port, that is connected to ECU 111 via a bus 113, which may be a CAN bus, Ethernet, FlexRay or any other bus that may be used in vehicles.

In accordance with embodiments of the present invention, computing environment 100 may also include a performance system 130 that includes a performance tool 131, a performance engine 132 and possibly a performance server 133. Performance tool 131 can be configured to connect to port 112 and to communicate with ECU 111 over bus 113. As one example only, performance tool 131 could be in the form of a dongle that plugs into a vehicle's OBD-2 port. In some embodiments, performance engine 132 may be configured to execute on an end user computing device 120 such as desktop, laptop, tablet or smart phone (e.g., as a desktop application, a mobile application, a web application, etc.). Performance engine 132 can be connected to performance tool 131 via a connection 134 which may represent a wired connection (e.g., a USB cable) or a wireless connection (e.g., a Wi-Fi or Bluetooth connection). In some embodiments, performance engine 132 could be implemented on performance tool 131 as opposed to on end user computing device 120 (e.g., when performance tool 131 includes user interface elements). In some embodiments, performance engine 132 may also be connected to performance server 133 via a connection 135 which may typically represent an internet connection.

Figure 2A:
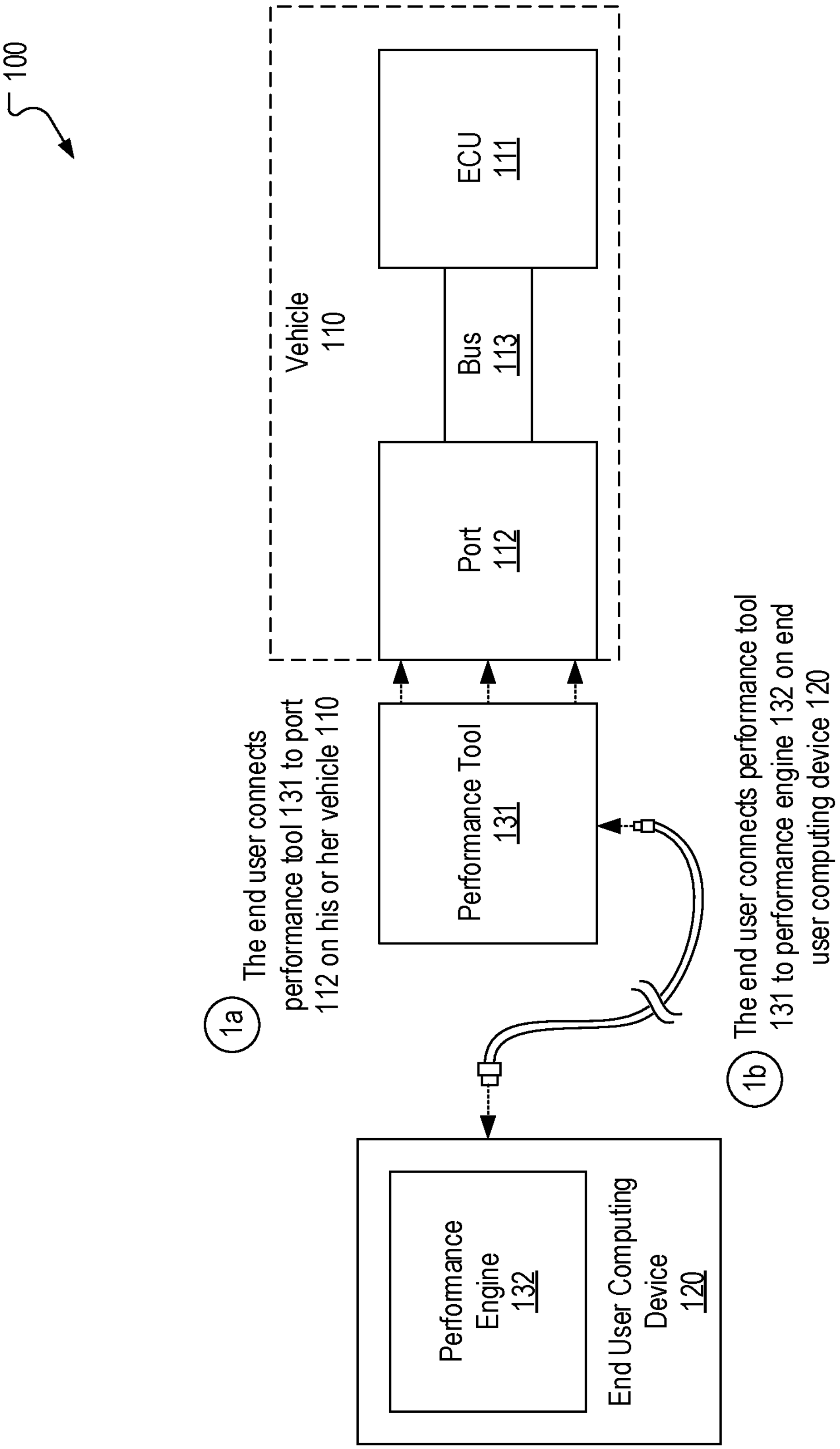
FIGS. 2A-2C provide an example of how a performance system can be used to create a log of performance data from a vehicle's ECU in accordance with one or more embodiments of the present invention.
Figure 2B:
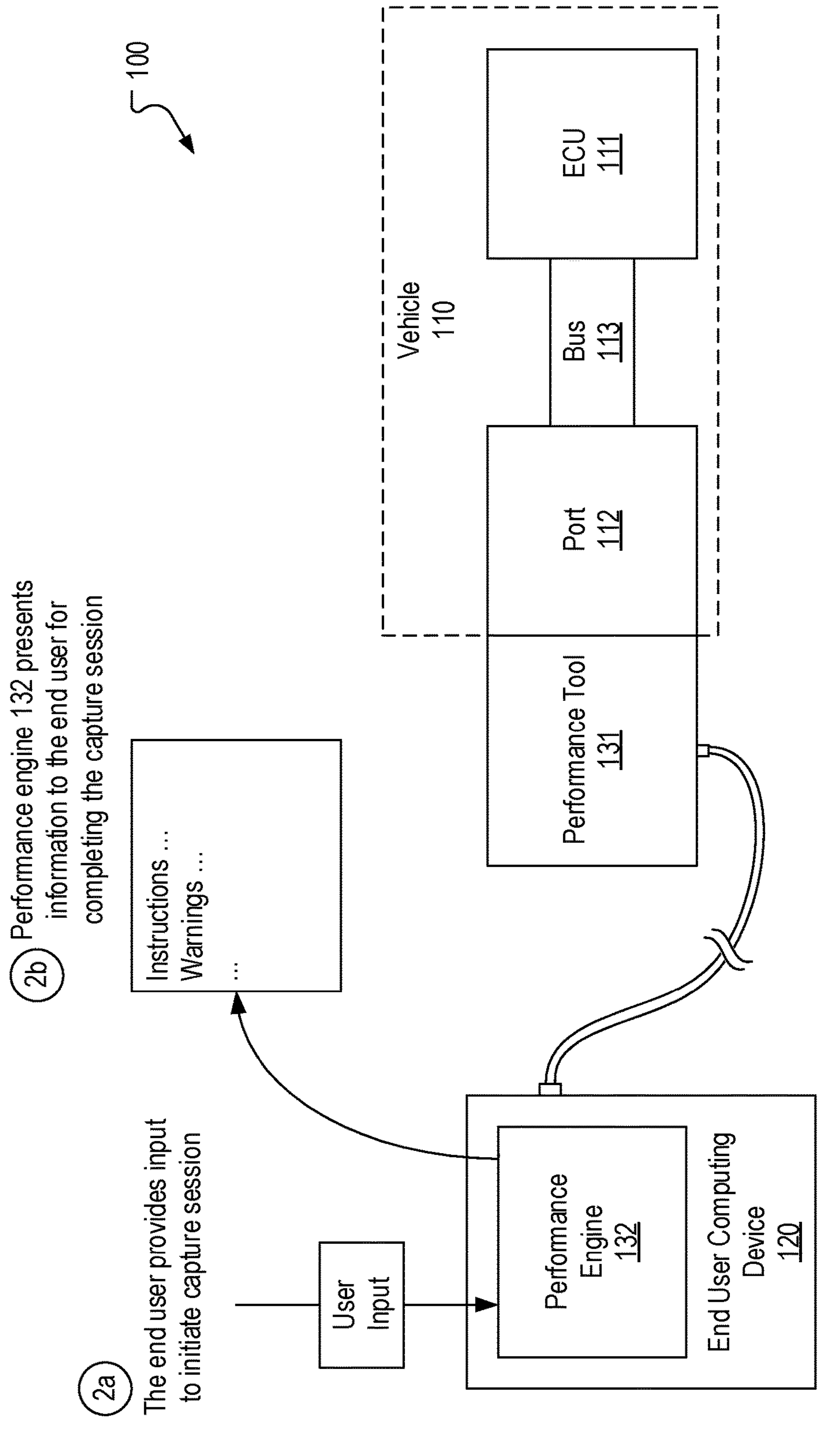
Figure 2C:
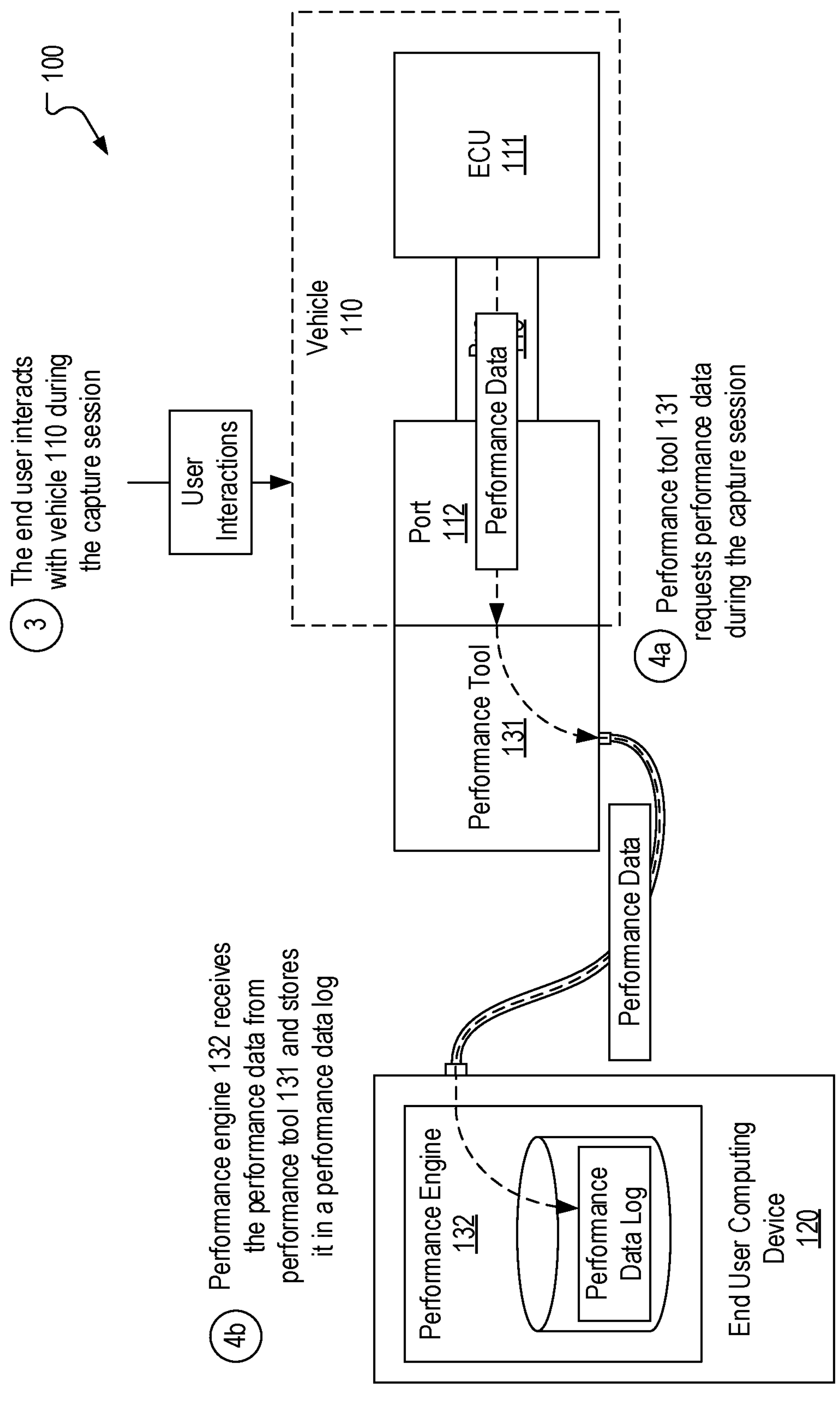

FIGS. 2A-2C provide an example of how performance engine 132 can capture performance data from ECU 111. In step 1*a* shown in FIG. 2A, the end user can connect performance tool 131 to port 112 on his or her vehicle 110. In step 1*b*, the end user can also connect performance tool 131 to performance engine 132 (e.g., by connecting a cable between end user computing device 120 and performance tool 131 or establishing a direct wireless connection between end user computing device 120 and performance tool 131).

Turning to FIG. 2B, in step 2*a*, the end user can provide input to performance engine 132 (e.g., by interacting with end user computing device 120) to request that a capture session be initiated. In response, in step 2*b*, performance engine 132 can present information to the end user for completing the capture session. For example, performance engine 132 could present instructions and/or warnings to the end user via a display of end user computing device 120. In some embodiments, these instructions could include a guided walk-through of how the end user should interact with vehicle 110 during the capture session. For example, the instructions could inform the end user that he or she should press on vehicle 110's accelerator during the capture session to cause vehicle 110's engine speed to vary during the capture session. In some embodiments, performance engine 132 could warn the end user that, if vehicle 110 is exhibiting certain behaviors, the end user should not proceed with the capture session.

Turning to FIG. 2C, in step 3, the end user can interact with vehicle 110 during the capture session as instructed by performance engine 132. In step 4*a*, performance tool 131 can request/read performance data from ECU 111 during the capture session. For example, performance tool 131 can repeatedly read various PIDs from ECU 111. In some embodiments, performance tool 131 may temporarily store all performance data readings it obtains during the capture session, whereas in other embodiments, performance tool 131 may discard any performance data readings it obtains while one or more vehicle conditions are not met. For example, if performance tool 131 determines that the accelerator pedal is not past a specified threshold, it may discard performance data readings until the accelerator pedal is past the specified threshold.

In step 4*b*, performance engine 132 can interface with performance tool 131 to receive the performance data generated during the capture session and store it in a performance data log. Although FIG. 2C represents that the performance data log is stored on end user computing device 120, it may also or alternatively be stored on performance server 133 or another server (e.g., in the cloud).

Regardless of where performance data log may be maintained, the end result of the capture session is the creation of a performance data log containing performance data that ECU 111 generated as the user interacted with vehicle 110. Notably, steps 2*b* and 3 may occur simultaneously and repeatedly during the capture session. For example, as performance engine 132 receives and evaluates the performance data during the capture session, performance engine 132 may instruct the end user to press more or less on the accelerator (e.g., to ensure that performance data is generated when vehicle 110 is operating at particular engine speeds or ranges) or to otherwise interact with vehicle 110 to ensure that performance data is captured when vehicle 110 is operating with one or more particular characteristics.

FIG. 3 provides an example of a performance data log 300 that performance engine 132 may capture in accordance with embodiments of the present invention. Each reading (or row) of performance data can include values for a plurality of performance parameters that existed at a particular time. For example, performance data log 300 includes a reading that occurred at time 00:30.273 when an engine speed performance parameter had a value of 3458 RPM, an intake air temperature performance parameter had a value of 39° C., an ignition correction cylinder 1 performance parameter had a value of 0 degrees, an ignition correction cylinder 2 performance parameter had a value of 0 degrees, an ignition correction cylinder 3 performance parameter had a value of −1.75 degrees, a high pressure fuel pump (HPFP) performance parameter had a value of 138829.144 hPa and a boost pressure performance parameter had a value of 1920.867 mBar.

As represented by the ellipses, each reading of performance data may include values for other performance parameters such as an ignition correction cylinder performance parameter for each cylinder vehicle 110 has, one or more oxygen sensor performance parameters, one or more fuel injector performance parameters, one or more short term fuel trim (STFT) performance parameters, one or more spark advance performance parameters, one or more accelerator pedal position performance parameters, one or more throttle position performance parameters, one or more bypass valve performance parameters, one or more air mass performance parameters, one or more HPFP capacity performance parameters, one or more low pressure fuel pump (LPFP) performance parameters, etc.

In some embodiments, performance engine 132 may create a modified performance data log 300*a* from performance data log 300. For example, performance engine 132 may remove/exclude any reading of performance data where the value of one or more performance parameters does not meet specified criteria (e.g., by falling below a threshold or falling outside a best-fit tolerance). As an example, in creating performance data log 300*a*, performance engine 132 may exclude any row in performance data log 300 having a value for the engine speed performance parameter that falls below a threshold such as 2000 RPM and/or a value of the accelerator pedal performance parameter that falls below a threshold such as 70%. Any other performance parameter could be used to perform this filtering of performance data log 300. In some embodiments, such as is represented in FIG. 3A, as part of creating performance data log 300*a*, performance engine 132 may calculate rounded values for the engine speed performance parameter. For example, performance engine 132 may round the RPM values to the nearest 500.

In some embodiments, performance engine 132 may augment performance data log 300 with data obtained from a source other than ECU 111. For example, performance engine 132 could obtain location (e.g., GPS) data, weather data or other context data and associate such data with the performance data in performance data log 300. In the case of location data, performance engine 132 can associate each reading of performance data with a location so that the vehicle's performance can be analyzed relative to its physical location (e.g., while driving up or downhill, around curves, on paved or dirt roads, etc.).

Figure 4A:
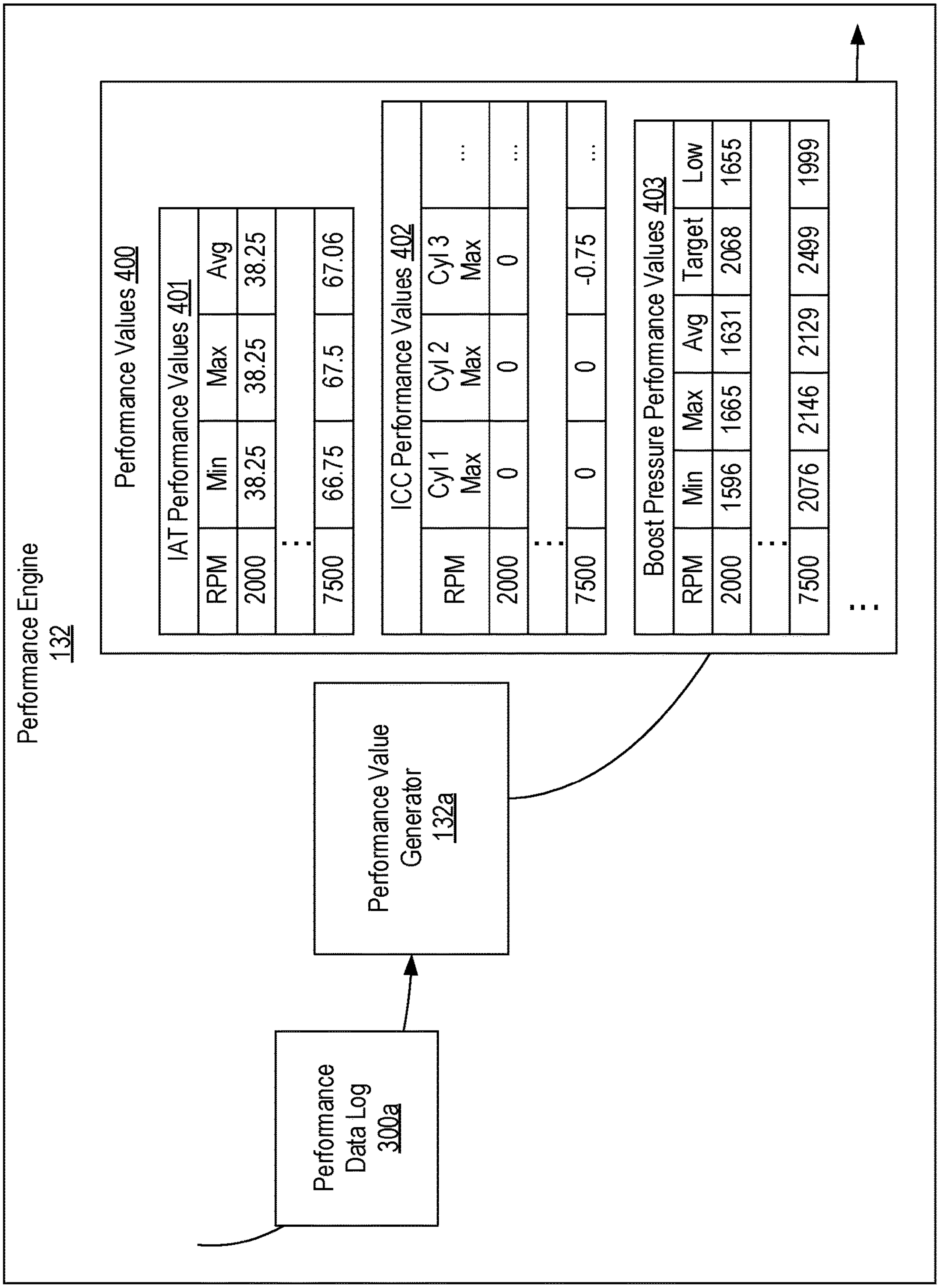
FIGS. 4A and 4B provide an example of how a performance system can generate performance values for performance parameters contained in a performance data log and then generate performance representations from the performance values in accordance with one or more embodiments of the present invention.

FIG. 4A provides an example of how performance engine 132 can process modified performance data log 300*a* to generate and/or calculate performance values for one or more performance parameters. As shown, performance engine 132 may include a performance value generator 132*a* that is configured to process performance data log 300*a* to thereby generate and/or calculate performance values for one or more performance parameters. For example, for some performance parameters, performance value generator 132*a* may process the values for the performance parameters in performance data log 300*a* to generate and/or calculate performance values 400 that include one or more of a minimum performance value, a maximum performance value, an average performance value, a target performance value, a threshold performance value, a smoothed performance value, etc. for the performance parameter at each of a plurality of engine speeds. FIG. 4A provides an example where performance values 400 include input air temperature performance values 401 consisting of minimum, maximum and average values for the input air temperature performance parameter at each of a plurality of values for the engine speed performance parameter (e.g., at 2500 RPM, 3000 RPM, 3500 RPM, . . . 7500 RPM). FIG. 4A also provides an example where performance values 400 include ignition correction cylinder performance values 402 consisting of maximum values for the six ignition correction cylinder performance parameters at each of the plurality of values for the engine speed performance parameter. FIG. 4A further provides an example where performance values 400 include boost pressure performance values 403 consisting of minimum, maximum, average, target, and low threshold values for the boost pressure performance parameter at each of the plurality of values for the engine speed performance parameter. Performance values 400 could include similar performance values for any of the performance parameters included in performance data log 300*a*. Accordingly, a performance value can be viewed as a value that is associated with a particular engine speed and that is generated/calculated from one or more values of a performance parameter for that particular engine speed.

In some embodiments, performance engine 132 can adjust performance values for one performance parameter based on another performance parameter. For example, using a barometric pressure performance parameter, performance engine 132 can adjust performance values for maximum boost pressure or acceleration so that the performance values represent expected maximums or ranges at other barometric pressures. Performance engine 132 can make such adjustments to assist a user in understanding how one performance parameter impacts another performance parameter.

Figure 4B:
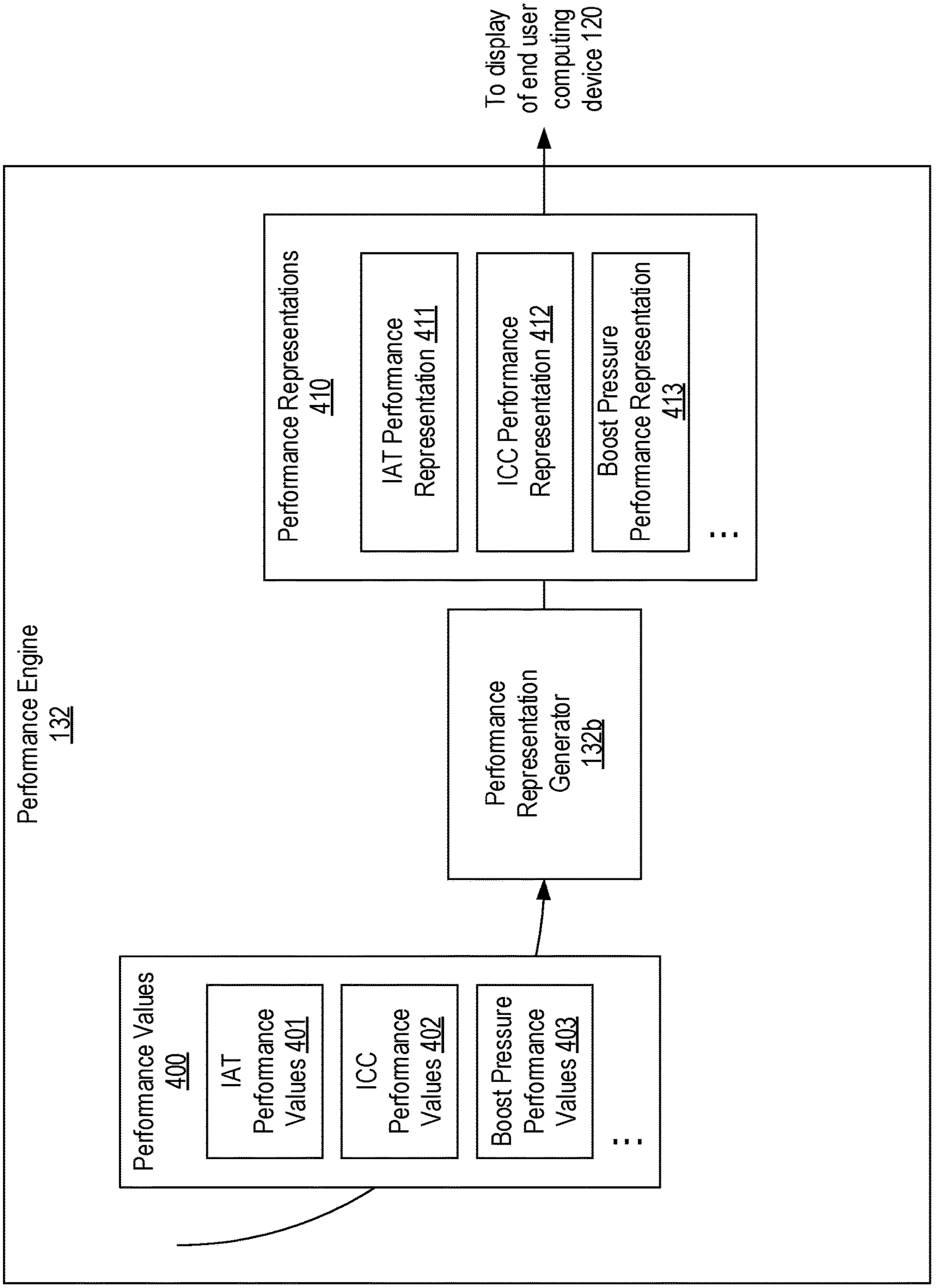

FIG. 4B provides an example of how performance engine 132 can generate performance representations 410 from performance values 400. As shown, performance engine 132 may include a performance representation generator 132*b* that is configured to receive performance values 400 and generate performance representations 410 therefrom. Performance representation generator 132*b* may generate a performance representation for each set of performance values 400. For example, FIG. 4B shows that performance representation generator 132*b* has generated performance representations 410 that include an input air temperature performance representation 411, an ignition correction cylinder performance representation 412 and a boost pressure performance representation 413 from input air temperature performance values 401, ignition correction cylinder performance values 402 and a boost pressure performance values 403 respectively.

Performance engine 132 can output performance representations 410 for display on end user computing device 120. For example, performance engine 132 may provide an option for the end user to select any of performance representations 410 that he or she desires to review after completing a capture session. Alternatively or additionally, performance engine 132 may send performance representations 410 and/or performance values 400 to performance server 133. For example, performance engine 132 may provide an option for the end user to upload performance representations 410 and/or performance values 400 to performance server 133 as part of a request for a specialist to analyze the performance of vehicle 110.

Figure 5:
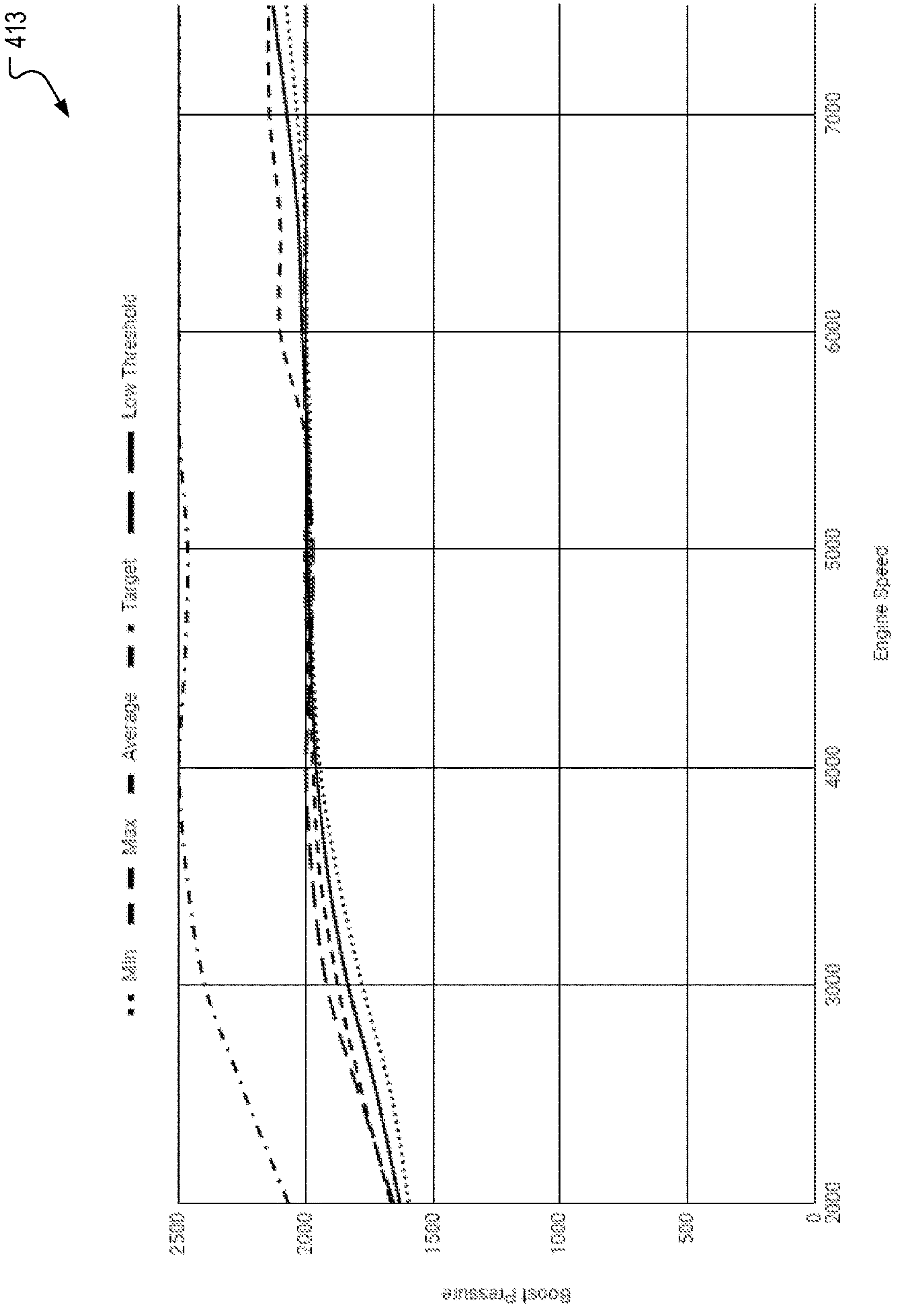
FIG. 5 provides an example of a performance representation.

FIG. 5 provides an example of a performance representation 410, which in this case is boost pressure performance representation 413. As shown, a performance representation 410 may be in the form of a visual chart or graph that correlates the various performance values for a particular performance parameter across the range of engine speeds. For example, the depicted boost pressure performance representation 413 includes a series for each of the minimum, maximum, average, target and low threshold boost pressure performance values 403 between 2000 RPM and 7500 RPM.

Performance representations 410 allow the end user to quickly identify whether vehicle 110 is performing properly with little or no training or experience. For example, by simply viewing boost pressure performance representation 413, the end user could determine that vehicle 110's minimum, maximum and average boost pressures are below that target boost pressure across the range of engine speeds. Similarly, by simply viewing boost pressure performance representation 413, the end user could determine that vehicle 110's minimum, maximum and average boost pressures are below that low threshold boost pressure at some engine speeds. In this way, performance engine 132 can assist an end user—who otherwise may not be competent to do so—to analyze and address the performance of vehicle 110.

In some embodiments, performance engine 132 may evaluate performance values 400 to determine if any of them represent a performance issue. If so, performance engine 132 may present to the end user an explanation of the performance issue and possibly one or more recommendations for addressing the performance issue. In some embodiments, performance engine 132 may present such performance issues in conjunction with presenting the corresponding performance representations 410. In this way, performance engine 132 can assist the end user in addressing any performance issues vehicle 110 may have.

Although each example provided above are based on correlating performance parameters/values with engine speed, a performance parameter other than engine speed can be used in some embodiments. For example, one or more performance parameters/values (e.g., intake air temperature) can be correlated with vehicle speed rather than engine speed in some embodiments.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A performance system comprising:

a performance tool that is configured to connect to an electronic control unit (ECU) of a vehicle and to read performance data from the ECU over a period of time, each reading of the performance data comprising values for a plurality of performance parameters; and a performance engine that interfaces with the performance tool to receive and store the performance data in a performance data log, the performance engine being configured to perform a method for enabling an end user to analyze performance of the vehicle using the performance data log, the method comprising:

processing the performance data log to generate a set of performance values for a first performance parameter of the plurality of performance parameters, wherein the set of performance values for the first performance parameter comprises performance values for the first performance parameter that correspond to different values for an engine speed performance parameter;

generating a performance representation from the set of performance values for the first performance parameter; and presenting the performance representation to the end user.

2. The performance system of claim 1, wherein the performance values for the first performance parameter that correspond to the different values for the engine speed performance parameter comprise minimum performance values for the first performance parameter at each of the different values for the engine speed performance parameter.

3. The performance system of claim 1, wherein the performance values for the first performance parameter that correspond to the different values for the engine speed performance parameter comprise maximum performance values for the first performance parameter at each of the different values for the engine speed performance parameter.

4. The performance system of claim 1, wherein the performance values for the first performance parameter that correspond to the different values for the engine speed performance parameter comprise average performance values for the first performance parameter at each of the different values for the engine speed performance parameter.

5. The performance system of claim 1, wherein the performance values for the first performance parameter that correspond to the different values for the engine speed performance parameter comprise target performance values for the first performance parameter at each of the different values for the engine speed performance parameter.

6. The performance system of claim 1, wherein the performance values for the first performance parameter that correspond to the different values for the engine speed performance parameter comprise high or low threshold performance values for the first performance parameter at each of the different values for the engine speed performance parameter.

7. The performance system of claim 1, wherein processing the performance data log includes rounding values for an engine speed performance parameter in the performance data log and generating the set of performance values for the first performance parameter using the rounded engine speed values.

8. The performance system of claim 1, wherein processing the performance data log includes excluding readings from the performance data log when the readings have a value for one of the plurality of performance parameters that does not meet specified criteria.

9. The performance system of claim 8, wherein a value for one of the plurality of performance parameters that does not meet specified criteria is a value for an engine speed performance parameter or a value for an accelerator pedal performance parameter.

10. The performance system of claim 1, wherein the first performance parameter is one of:

an intake air temperature performance parameter;
an ignition correction cylinder performance parameter;
a high pressure fuel pump performance parameter;
a low pressure fuel pump performance parameter;
a boost pressure performance parameter;
an oxygen sensor performance parameter;
a fuel injector performance parameter;
a short term fuel trim performance parameter;
a throttle position performance parameter;
a bypass valve performance parameter; and
an air mass performance parameter.

11. The performance system of claim 1, wherein processing the performance data log to generate the set of performance values for the first performance parameter of the plurality of performance parameters comprises:

adjusting the set of performance values for the first performance parameter based on values of one or more other performance parameters.

12. The performance system of claim 1, wherein the method further comprises:

presenting, to the end user, instructions to interact with the vehicle before or while the performance tool reads the performance data from the ECU.

13. A method for enabling an end user to analyze performance of a vehicle using a performance data log, the method comprising:

obtaining a performance data log containing performance data read from an ECU of the vehicle over a period of time, each reading of the performance data comprising values for a plurality of performance parameters;

processing the performance data log to generate a set of performance values for a first performance parameter that correspond to different values for an engine speed performance parameter;

generating a performance representation from the set of performance values for the first performance parameter; and presenting the performance representation to the end user.

14. The method of claim 13, wherein the set of performance values for the first performance parameter that correspond to the different values for the engine speed performance parameter comprise one or more of:

minimum performance values for the first performance parameter at each of the different values for the engine speed performance parameter;

maximum performance values for the first performance parameter at each of the different values for the engine speed performance parameter;

average performance values for the first performance parameter at each of the different values for the engine speed performance parameter;

target performance values for the first performance parameter at each of the different values for the engine speed performance parameter; or high or low threshold performance values for the first performance parameter at each of the different values for the engine speed performance parameter.

15. The method of claim 13, further comprising:

augmenting the performance data log with data obtained from a source other than the ECU.

16. The method of claim 13, wherein the set of performance values for the first performance parameter that correspond to the different values for the engine speed performance parameter comprise each of:

minimum performance values for the first performance parameter at each of the different values for the engine speed performance parameter;

maximum performance values for the first performance parameter at each of the different values for the engine speed performance parameter;

average performance values for the first performance parameter at each of the different values for the engine speed performance parameter;

target performance values for the first performance parameter at each of the different values for the engine speed performance parameter; and high or low threshold performance values for the first performance parameter at each of the different values for the engine speed performance parameter.

17. One or more computer storage media storing computer executable instructions which when executed by one or more processors implement a method for enabling an end user to analyze performance of a vehicle using a performance data log, the method comprising:

obtaining a performance data log containing performance data read from an ECU of the vehicle over a period of time, each reading of the performance data comprising values for a plurality of performance parameters;

processing the performance data log to generate a first set of performance values for a first performance parameter that correspond to different values for an engine speed performance parameter and to generate a second set of performance values for a second performance parameter that correspond to the different values for the engine speed performance parameter;

generating a first performance representation from the first set of performance values for the first performance parameter and a second performance representation from the second set of performance values for the second performance parameter; and presenting the first and second performance representations to the end user.

18. The computer storage media of claim 17, wherein the first set of performance values for the first performance parameter that correspond to the different values for the engine speed performance parameter comprise:

minimum performance values for the first performance parameter at each of the different values for the engine speed performance parameter;

maximum performance values for the first performance parameter at each of the different values for the engine speed performance parameter; and average performance values for the first performance parameter at each of the different values for the engine speed performance parameter.

19. The computer storage media of claim 18, wherein the second set of performance values for the second performance parameter that correspond to the different values for the engine speed performance parameter comprise one or more of:

minimum performance values for the second performance parameter at each of the different values for the engine speed performance parameter;

maximum performance values for the second performance parameter at each of the different values for the engine speed performance parameter;

average performance values for the second performance parameter at each of the different values for the engine speed performance parameter;

target performance values for the second performance parameter at each of the different values for the engine speed performance parameter; or high or low threshold performance values for the second performance parameter at each of the different values for the engine speed performance parameter.

* * * * *